US011062484B2

(12) United States Patent
Miyoshi et al.

(10) Patent No.: US 11,062,484 B2
(45) Date of Patent: Jul. 13, 2021

(54) IMAGE PROCESSING DEVICE, METHOD, AND PROGRAM FOR RENDERING DISPLAY DATA OF A MATERIAL (71) Applicant: TOPPAN PRINTING CO., LTD., Taito-ku (JP)

(72) Inventors: Yuki Miyoshi, Taito-ku (JP); Noriyuki Abe, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 0 days.

(21) Appl. No.: 15/843,099

(22) Filed: Dec. 15, 2017

(65) Prior Publication Data

US 2018/0108154 A1    Apr. 19, 2018

Related U.S. Application Data (63) Continuation of application No. PCT/JP2016/002724, filed on Jun. 6, 2016.

(30) Foreign Application Priority Data

Jun. 17, 2015   (JP) .............................. JP2015-122397

(51) Int. Cl.
G06T 11/00 (2006.01)
G06T 15/50 (2011.01)
G06T 15/04 (2011.01)
G06T 19/00 (2011.01)

(52) U.S. Cl.
CPC ............ *G06T 11/001* (2013.01); *G06T 15/04* (2013.01); *G06T 15/50* (2013.01); *G06T 15/506* (2013.01); *G06T 19/00* (2013.01); *G06T 2210/04* (2013.01)

(58) Field of Classification Search
CPC ..... G06T 11/001; G06T 15/50; G06T 15/506; G06T 19/00; G06T 2210/04
USPC ......................................................... 345/582
See application file for complete search history.

(56) References Cited

U.S. PATENT DOCUMENTS 5,974,168 A * 10/1999 Rushmeier .............. G06T 7/586
382/141
7,224,360 B2   5/2007 Tatsumi
8,773,433 B1 * 7/2014 Smyrl ................... G06T 15/506
345/420
8,872,811 B1 * 10/2014 Rump ................. G06F 17/5009
345/418

(Continued)

FOREIGN PATENT DOCUMENTS

JP      11-175751 A    7/1999
JP    2003-132350 A    5/2003

(Continued)

OTHER PUBLICATIONS

Machine Transation to English from JP 2013-003848 A.*

(Continued)

*Primary Examiner* — Terrell M Robinson
(74) *Attorney, Agent, or Firm* — Oblon, McClelland, Maier & Neustadt, L.L.P.

(57) ABSTRACT

An image processing device including circuitry that renders display data of a material based on illumination information, material information including texture information of the material, and a relative positional relationship of a light source, a display surface of a display on which an image of the material is displayed, and a viewer.

17 Claims, 6 Drawing Sheets

(56) References Cited

U.S. PATENT DOCUMENTS

| | | | |
|---|---|---|---|
| 2002/0150288 A1* | 10/2002 | Fujiwara | G06T 17/10 382/154 |
| 2007/0229529 A1* | 10/2007 | Sekine | G06T 15/04 345/582 |
| 2009/0102834 A1* | 4/2009 | Tomite | G06T 19/00 345/419 |
| 2009/0109240 A1* | 4/2009 | Englert | G06T 19/006 345/633 |
| 2011/0273369 A1* | 11/2011 | Imai | G06T 15/20 345/158 |
| 2012/0036433 A1 | 2/2012 | Zimmer et al. | |
| 2012/0194517 A1* | 8/2012 | Izadi | G06T 17/00 345/420 |
| 2013/0234934 A1* | 9/2013 | Champion | G06F 3/0304 345/156 |
| 2013/0332843 A1* | 12/2013 | Boettcher | G06F 3/0481 715/744 |
| 2014/0125659 A1* | 5/2014 | Yoshida | G06T 15/506 345/419 |
| 2014/0191947 A1* | 7/2014 | Sharma | G06F 3/0346 345/156 |
| 2016/0225164 A1* | 8/2016 | Tomlin | G06T 15/04 |

FOREIGN PATENT DOCUMENTS

| | | |
|---|---|---|
| JP | 2013-003848 A | 1/2013 |
| JP | 2013-101611 A | 5/2013 |

OTHER PUBLICATIONS

Machine Translation to English from JPH 11-17575 A.*
Imber, James, "Free-viewpoint video rendering for mobile devices", "MIRAGE '13: Proceedings of the 6th International Conference on Computer Vision / Computer Graphics Collaboration Techniques and Applications", Jun. 2013, Article No. 11, pp. 1-8 (Year: 2013).*
International Search Report dated Aug. 16, 2016 in PCT/JP2016/002724, filed Jun. 6, 2016.
Supplementary Search Report issued in European Patent Application No. 16811205.0-1230 / 3312802 PCT/JP2016002724. (10 pages).
Office Action dated Nov. 12, 2019 in Japanese Patent Application No. 2015-122397, 3 pages (with English translation).

\* cited by examiner

IMAGE PROCESSING DEVICE, METHOD, AND PROGRAM FOR RENDERING DISPLAY DATA OF A MATERIAL

CROSS-REFERENCE TO RELATED APPLICATIONS

The present application is a continuation of International Application No. PCT/JP2016/002724, filed Jun. 6, 2016, which is based upon and claims the benefits of priority to Japanese Application No. 2015-122397, filed Jun. 17, 2015. The entire contents of these applications are incorporated herein by reference.

BACKGROUND OF THE INVENTION

Field of the Invention

The present invention relates to an image processing device, method, and program, and more particularly, to an image processing device, method, and program for displaying the texture of the material of a displayed object.

Discussion of the Background

Thanks to the recent development in manufacturing technology, communication technology, and information processing technology, mobile terminals such as smart phones and tablet terminals are used in various situations. Situations where composite mobile terminals including various functions such as GPS, a gyro sensor, and a camera in addition to a touch panel display and a communication interface are adapted are expected to expand further in the future.

For example, conventionally, products subject to commercial transactions have been introduced by presenting them in pictures and illustrations on paper brochures. Products such as interior and exterior decoration materials whose material texture is difficult to perceive from pictures and illustrations (color samples) have been introduced in the form of sample collections including small pieces of the real products.

A method and device have been proposed for displaying the texture of a subject (material) such as the gloss of the surface of the subject or the fine texture of a woven fabric (see, for example, PTL 1). PTL 1 discloses, regarding a still subject having different states of specular reflection, obtaining a plurality of original images of the still subject changing at least one of a position and a direction of illumination of a light source to illuminate the still subject, creating a plurality of frame images of the still subject based on the plurality of original images, sequentially switching the frame images to display the still subject, and forming image signals of the frame images by generating gloss signals using specular reflection image signals and diffuse reflection image signals of the subject and carrying out windowing on the gloss signals.

Further, practical application of a technique that changes the texture of a material by adding depth to a still image by applying, for example, the parallax effect is in progress.
PTL 1
  JP 2003-132350 A (see Abstract, Claims 1 and 2, etc.)

SUMMARY OF THE INVENTION

According to an aspect of the present invention, an image processing device including circuitry that renders display data of a material based on illumination information, material information including texture information of the material, and a relative positional relationship of a light source, a display surface of a display on which an image of the material is displayed, and a viewer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Embodiments of the present invention will be described in detail with reference to the drawings. The image displaying device, method, and program described below are suitable for an electronic sample book of interior and exterior decoration materials used in indoor and outdoor spaces of houses and the like. That is, an image displaying device, method, and program according to the present embodiment enable displaying the texture of a decorative material in accordance with a change in the observation environment or a change in the orientation of the decorative material, and could become an alternative to a sample collection including pieces of the real products or a mere color sample.

The present invention is not limited to decorative materials. It can be implemented in other examples without losing generality. For example, indoor/outdoor spaces such as of houses can be generalized to spaces including the inside and outside spaces of vehicles such as cars, trains, ships, and airplanes. Decorative materials include flooring materials (boards, carpets, stones, tiles), inner wall materials (boards, cloths (leather, synthetic leather, paper, synthetic resin, decorative sheets, etc.)), outer wall materials (siding materials (board materials, stone materials, tile materials, etc.)), and ceiling materials (boards, cloths (leather, synthetic leather, paper, synthetic resin, decorative sheets, etc.)), but they can be generalized to "materials" including interior decoration materials (leather, synthetic leather, cloth, synthetic resin, decorative sheets, etc.) and exterior decoration materials of vehicles and the like.

Figure 1:
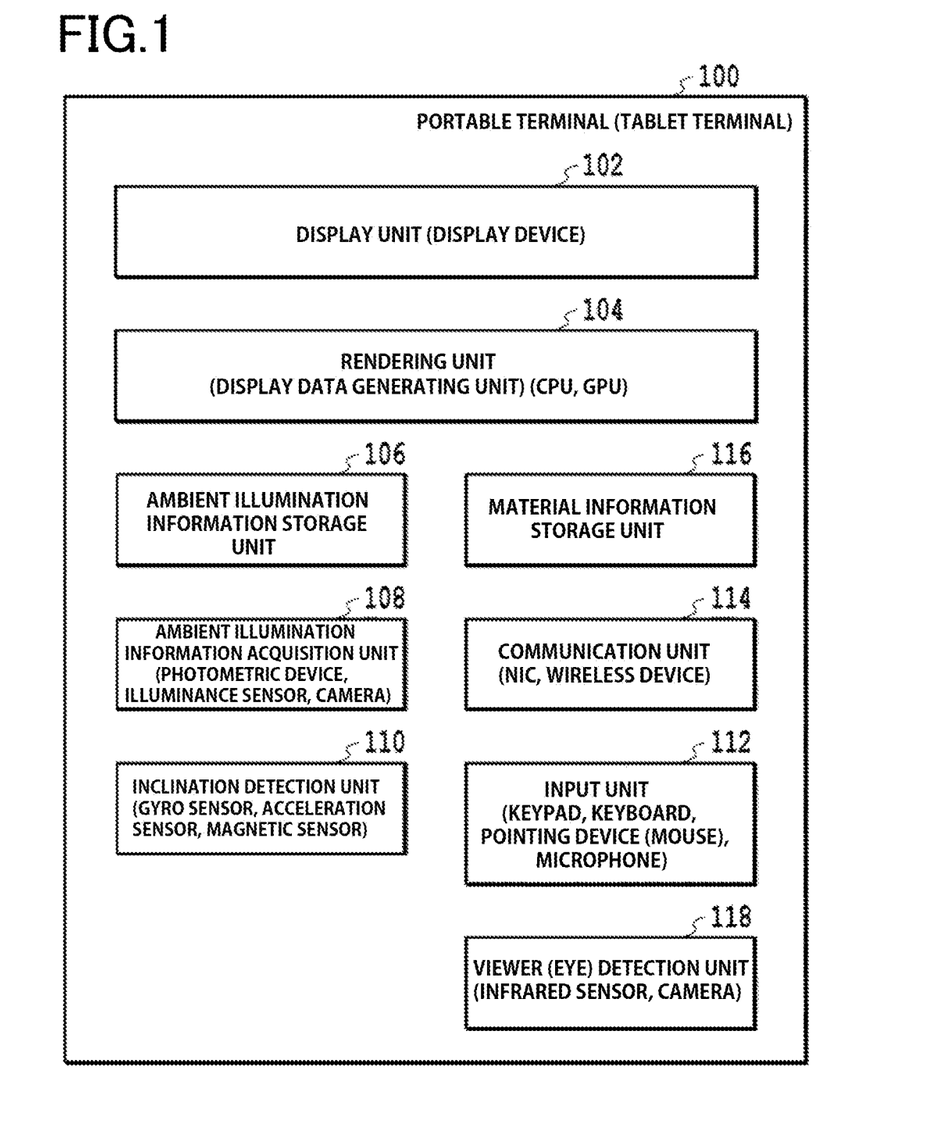
FIG. 1 is a functional block diagram of an image processing device according to one embodiment of the present invention.

FIG. 1 is a functional block diagram of a portable terminal which is an embodiment of the image processing device according to the present invention. The portable terminal 100 of FIG. 1 is, for example, a tablet terminal, and includes a display, a processor, a memory, and various sensors. The portable terminal 100 may include a communication device, a keyboard, a pointing device including a computer mouse, and an input device such as a microphone. The input device constitutes an input unit 112.

The display device can be any display device suitable for displaying an image, and preferably, without limitation, it is a touch display device of an electromagnetic induction type, a capacitive type, or a pressure sensitive type. The display device constitutes a display unit 102. An electromagnetic induction, capacitive, or pressure sensitive touch display device constitutes the display unit 102 and input unit 112.

The processor may include not only a CPU but also a GPU and/or a coprocessor. The processor generates display data corresponding to the image displayed on the display unit. The processor constitutes a rendering unit (display data generating unit) 104.

The memory may be either a magnetic drive such as an HDD or a semiconductor drive such as an SSD. The memory may be a built-in type or an external type. The memory constitutes an ambient illumination information storage unit 106 and a material information storage unit 116. The memory may also store information on the inclination of the tablet terminal (the orientation of the display surface) detected by an inclination detection unit 110.

The various sensors may be any device suitable for acquiring illumination information around the tablet terminal (ambient illumination information) (hereinafter referred to as an ambient illumination information acquisition device) and any device suitable for detecting the inclination of the tablet terminal (inclination detection device). For example, the ambient illumination information acquisition device may be one or more of a photometric device, an illuminance sensor, and a camera. The ambient illumination information acquisition device may be a built-in type or an external type. Further, for example, the inclination detection device can be one or more of a gyro sensor, an acceleration sensor, and a magnetic sensor. The ambient illumination information acquisition device constitutes an ambient illumination information acquisition unit 108 together with the processor or by itself. Further, the inclination detection device constitutes the inclination detection unit 110 together with the processor or by itself. In addition, the various sensors may include a device suitable for detecting the position of the viewer (for example, the viewer's eyes). Such a device may be one or more of an infrared sensor and camera.

For example, a camera as an ambient illumination information acquisition device may be an omnidirectional camera, and the color and brightness of the omnidirectional image obtained by capturing the overall surroundings of the tablet terminal with such a camera may be used as the illumination information of the real environment (ambient illumination information). Alternatively, whether it is a built-in camera or an external camera, a reference image acquired with the camera placed on a horizontal plane may be combined (connected) with images of the overall surroundings of the tablet terminal acquired separately changing the orientation of the camera so as to form an omnidirectional image, and the color or brightness of the generated omnidirectional image can be used as the illumination information of the real environment (ambient illumination information). When the dynamic range (latitude) of the image sensor of the camera is narrower than the luminance range of the luminance distribution of the real environment around the tablet terminal, an image acquisition technique which synthesizes images shot varying the exposure amount in multiple stages (high dynamic range imaging: HDR) may also be used.

For example, the position of the face (eyes) of the operator (viewer) of the tablet terminal can be identified from the image captured by a built-in camera of the tablet terminal (or an external camera whose relative positional relationship with the tablet terminal is already known), and then the relative positional relationship between the display surface of the tablet terminal and the viewer can be determined. The relative positional relationship between the display surface of the tablet terminal and the viewer can be identified in real time by repeating the image acquisition and the determination of the position of the face (eyes) of the viewer at a short time interval.

The communication device may be one or more of a bus (for example, USB (Universal Serial Bus)) interface for connection with an external device, a network interface card (NIC) for wired communication, and a wireless device for wireless communication. The communication device constitutes a communication unit 114. The tablet terminal 100 may acquire illumination information and material information from the outside via the communication unit 114. The externally acquired illumination information can be used as an alternative to the ambient illumination information.

The ambient illumination information storage unit 106 stores ambient illumination information acquired by the ambient illumination information acquisition unit 108 or external illumination information acquired from the outside via the communication unit 114, or these are stored in advance.

The material information storage unit 116 stores material information acquired from the outside via the communication unit 114. The material information is information on the texture of the material. The material information includes the normal information for each pixel (shape characteristics: information indicating the orientation of the pixel face at the decorative material (floor material, wall material, ceiling material); for example, it is normal vector information for each pixel). In addition, the material information includes, for each pixel, information on the intensity of specular reflection (for example, specular reflectance), information on the sharpness of specular reflection (for example, micro roughness of the surface, standard deviation of surface roughness, roughness), and information on the intensity of diffuse reflection (scatter reflection) (for example, diffuse reflectance, RGB indicative of the original color of the material). The information on the intensity and sharpness of specular reflection and the information on the intensity of diffuse reflection are also referred to as reflection characteristics. The Information on the intensity of diffuse reflection may be information on the intensity of diffuse reflection of each RGB of each pixel (for example, diffuse reflectance of each of RGB). The Information on the intensity of specular reflection may be information on the intensity of specular reflection of each of RGB of each pixel (for example, specular reflectance of each of RGB). Display data is generated based on the ambient illumination information (or illumination information acquired from the outside) and material information. As a result, the texture of the material (glossiness, roughness, unevenness) is displayed.

The tablet terminal 100 includes a UI providing unit (not shown) that provides a user interface (UI) for interaction with a viewer. The viewer can select the material to be displayed through the UI. That is, the tablet terminal 100 can receive the selection of material from the viewer via the UI and display the material on the display. The UI may include a hierarchically categorized menu that enables the viewer to select the material to be displayed. For example, the materials may be classified to categories such as wall materials, floor materials, and ceiling materials, so that the viewer can select the material following the category hierarchy. In the subcategories, thumbnails of a plurality of materials may be presented so that the viewer can select the materials to be displayed.

Figure 2:
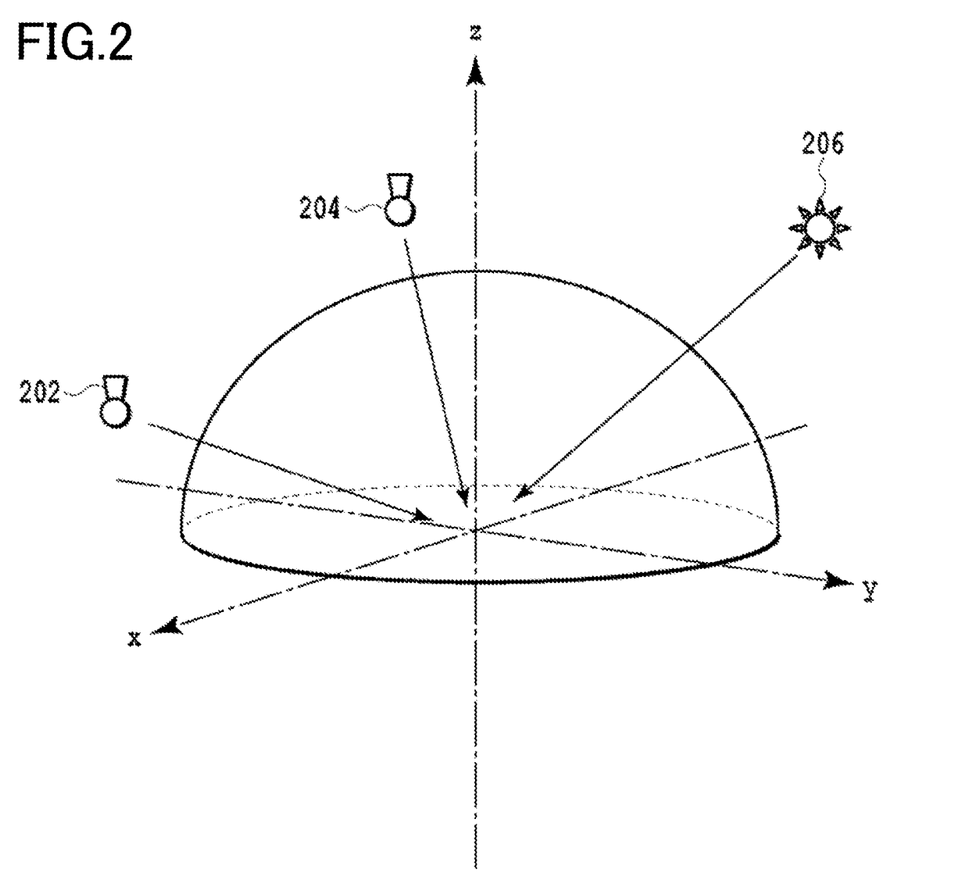
FIG. 2 is a diagram for describing an embodiment of the present invention.

FIG. 2 shows a space in which the ambient illumination information is acquired by the ambient illumination information acquisition unit 108. In FIG. 2, the x-axis and the y-axis are orthogonal to each other in a horizontal plane, and the z-axis is an axis orthogonal to the horizontal plane. In the space of FIG. 2, a total of three light sources are shown, including two electric lamps 202 and 204 and the sun 206. With the intersection of the x-axis, the y-axis, and the z-axis being the position of the ambient illumination information acquisition unit 108, light from the three light sources of the two electric lamps 202 and 204 and the sun 206 is observed, and the direction, color components, and intensity (luminance) of the light observed for each light source are obtained as the ambient illumination information in the space. The number of light sources is not limited to three. The light source is not limited to a light emitting object, and may be a reflector that reflects light towards the ambient illumination information acquisition unit 108. The ambient illumination information (the direction, color components, and intensity of light) of all of the light sources observed in the space may be acquired. The obtained ambient illumination information is stored in the ambient illumination information storage unit 106.

As an alternative to the ambient illumination information, it is possible to acquire illumination information from the outside via the communication unit 114. The illumination information acquired from the outside is also referred to as external illumination information. The external illumination information and ambient illumination information are simply referred to as illumination information. The external illumination information may be information on the illumination in a modeled space such as a room with a south-facing window (a window through which sunlight enters) and four down lights, or a bedroom without a window but with one electric lamp (information of illumination stored in advance in an external server computer or the like). The modeled space may be one or more spaces within a layout of a model room of a building being sold/planned to be built.

Figure 3:
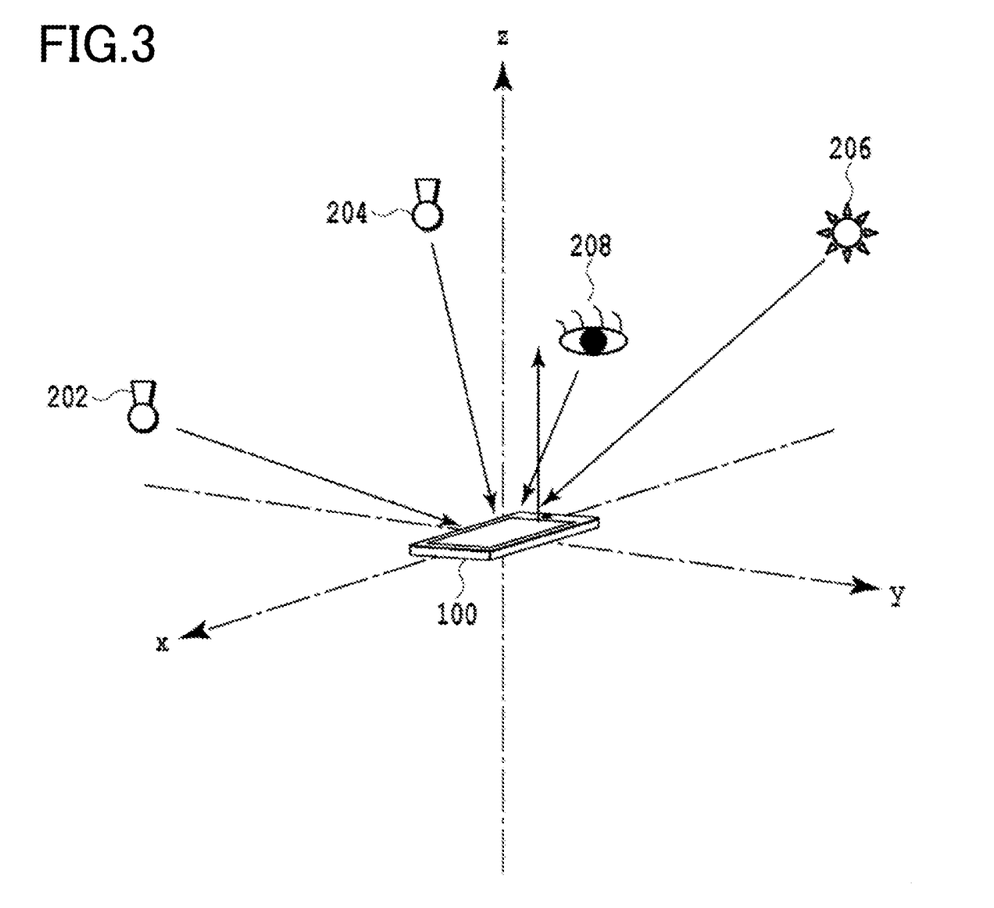
FIG. 3 is a diagram for describing an embodiment of the present invention.

FIG. 3 shows a state in which the tablet terminal 100 is placed in the space shown in FIG. 2. FIG. 2 also shows an eye 208 of the viewer of the image displayed by the tablet terminal 100. The tablet terminal 100 is placed at the intersection of the x-axis, the y-axis, and the z-axis so that the display surface faces upward and the display surface is parallel to the xy plane. The direction of the eye 208 may be a direction relative to the normal of the display surface detected by the viewer detection unit 118, or a predetermined direction with respect to the normal of the display surface (not detected by the viewer detection unit 118).

In the state shown in FIG. 3, the rendering unit 104 generates display data of the material as if the surface of the material is overlaid on the display surface. When the generated display data is displayed on the display device, the viewer holding the tablet terminal 100 can observe the texture of the material as if he or she is holding the material with his or her own hand.

The rendering unit 104 reads out the material information of the material to be rendered from the material information storage unit 116 (normal information (shape characteristics), information on the intensity and sharpness of specular reflection, and information on the intensity of diffuse reflection (reflection characteristics) for each pixel), reads out the illumination information from the ambient illumination information storage unit 106 (the direction, color components, and intensity (luminance) of the light from one or more light sources), and generates the display data by calculating the color components and intensity (luminance) of each pixel reflected in the direction of the viewer. Using the generated display data, an image is displayed on the display unit. In the state shown in FIG. 3, the color components and intensity (luminance) of the light entering from the three light sources (two lamps 202 and 204 and the sun 206) on the surface of the material and reflecting in the direction of the eye 208 are calculated.

Figure 4:
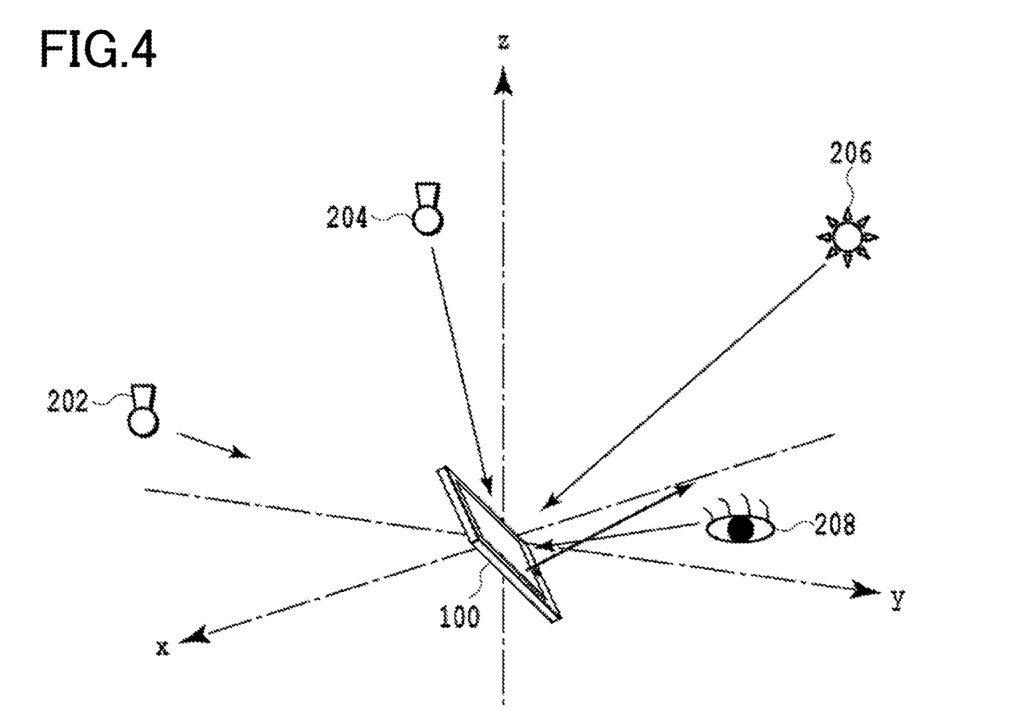
FIG. 4 is a diagram for describing an embodiment of the present invention.

In the state shown in FIG. 4, the display surface of the tablet terminal 100 is inclined from the horizontal plane (xy plane). The degree of inclination is such that the light of the electric lamp 202 does not enter the display surface. The inclination detection unit 110 detects this inclination, and the rendering unit 104 takes into consideration the detected inclination when generating the display data. That is, the rendering unit 104 calculates the color components and intensity (luminance) of the light entering from the two light sources (one lamp 204 and the sun 206) on the surface of the material and reflecting in the direction of the eye 208 and generates the display data.

Figure 5:
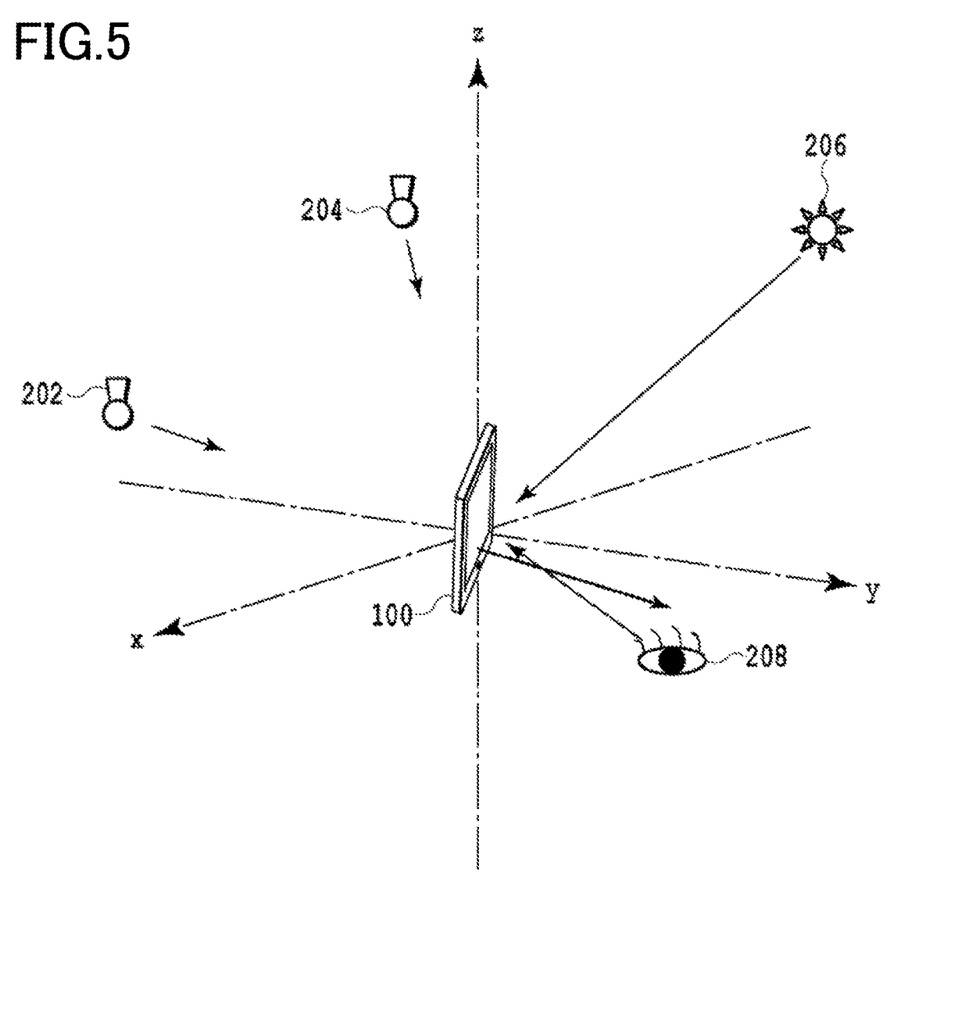
FIG. 5 is a diagram for describing an embodiment of the present invention.

Further, in the state shown in FIG. 5, the display surface of the tablet terminal 100 is disposed parallel to the z-axis. In this orientation, the light of the two electric lamps 202 and 204 does not enter the display surface. The inclination detection unit 110 detects the inclination of the tablet terminal 100 at this time, and the rendering unit 104 takes into consideration the detected inclination when generating the display data. That is, the rendering unit 104 calculates the color components and intensity (luminance) of the light entering from only the one light source (the sun 206) on the surface of the material and reflecting in the direction of the eye 208 and generates the display data.

As described with reference to FIGS. 3 to 5, the display data generated by the rendering unit 104 takes account of the inclination of the tablet terminal 100 (the orientation of the display surface) and the position (the direction) of the eye. Thus, tilting the tablet terminal 100 or changing the position (the direction) of the eye, the viewer holding the tablet terminal 100 can view the texture of the material in the same way as when viewing the real material.

The rendering unit 104 can also have a zoom function. As described above, the rendering unit 104 generates the display data of the material as if the surface of the material is overlaid on the display surface. The distance between the display surface and the viewer holding the tablet terminal 100 is substantially the length of the arm of the viewer and does not change significantly. Accordingly, it is useful that the rendering unit 104 is implemented with a zoom function that generates the display data of the material as if the material is placed between the display surface and the viewer in response to a zoom-in instruction from the viewer received via the user interface (UI), or generates the display data of the material as if the display surface is placed between the material and the viewer (the material is placed behind the display surface) in response to a zoom-out instruction received via the UI. For example, when the viewer holds the tablet terminal so that the display surface is perpendicular to the horizontal plane to view the material of a wall material, the viewer may use the zoom-out function to view the texture of the material on the assumption that the wall is 2 to 3 m away.

Figure 6:
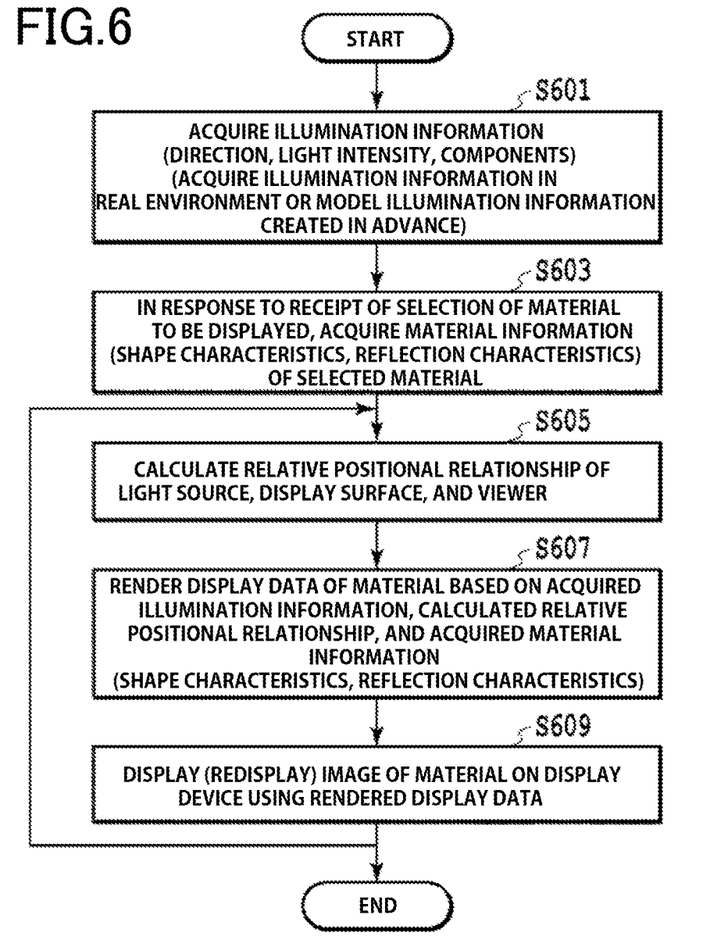
FIG. 6 is a flowchart of an image processing method according to one embodiment of the present invention.

FIG. 6 is a flowchart of the process executed by an image processing method, which is an example of the process executed by the above-described portable terminal 100.

At step S601, the portable terminal 100 (the rendering unit 104) acquires ambient illumination information. The illumination information acquired by the ambient illumination information acquisition unit 108 in the real environment in which the portable terminal is placed, or the illumination information stored in the ambient illumination information storage unit 106 is acquired. Alternatively, the external illumination information in the modeled space acquired through the communication unit 114 or the external illumination information acquired through the communication unit 114 and stored in the ambient illumination information storage unit 106 is acquired.

At step S603, the portable terminal 100 (the rendering unit 104) acquires the material information of the material to be displayed (shape characteristics, reflection characteristics). The material information acquired from the outside via the communication unit 114 and stored in the material information storage unit 116 is acquired. For example, the shape characteristics are normal vector information for each pixel of the material, and the reflection characteristics are information on the intensity of specular reflection (specular reflectance for each of RBG), the sharpness of specular reflection (micro roughness of the surface, standard deviation of surface roughness, roughness), and information on the intensity of diffuse reflection (diffuse reflectance for each of RGB, RGB corresponding to the original color) for each pixel.

At step S605, the portable terminal 100 (the rendering unit 104) determines the relative positional relationship of light sources, the display surface, and the viewer. The portable terminal 100 (the rendering unit 104) can determine the relative positional relationship of the light sources, the display surface, and the viewer by a calculation using the direction of light included in the illumination information, and at least one of the orientation of the display surface and the direction of the viewer's eye. The inclination of the portable terminal and the direction of the viewer's eye are detected by the inclination detection unit 110 and the viewer detection unit 118, respectively, and are held in a memory or the like so that the rendering unit 104 can access them.

At step S607, the portable terminal 100 (the rendering unit 104) renders the display data of the material based on the acquired illumination information, the calculated relative positional relationship, and the acquired material information (shape characteristics, reflection characteristics).

At step S609, the display unit 102 displays (redisplays) the image of the material on the display unit 102 using the display data.

Note that step S601 may be executed after step S603. In particular, when using the illumination information acquired in the real environment, step S601 may be included in the loop from step S605 to S609 and the illumination information may be re-acquired each time the rendering unit 104 renders the display information.

One embodiment of an image processing device and method for displaying the texture of a material in accordance with a change in the observation environment or a change in the orientation of the material has been described above with reference to an example where a portable terminal such as a tablet terminal is used. However, the image processing device and method of the present invention are not limited to the above embodiment, and the present invention can be implemented in other forms without losing generality.

For example, the image processing device of the present invention may be implemented using a computer (another computer different from the portable terminal such as a server computer, a desktop computer, or a laptop computer) that communicates with the portable terminal. That is, the rendering unit may be implemented by the CPU, GPU, or co-processor of another computer different from the portable terminal, and the rendering unit of the computer may render the display data of the material based on illumination information, material information on the texture of the material, and the relative positional relationship of light sources, a display surface on which the image of the material is displayed, and a viewer. The computer having the rendering unit can use illumination information (ambient illumination information) received from the portable terminal to render the display data. The computer having the rendering unit can use illumination information (external illumination information) received from a further computer different from the portable terminal or stored in a memory or the like to render the display data. The computer having the rendering unit can use the relative positional relationship of light sources, a display surface, and a viewer of the image of the material received from the portable terminal to render the display data. The portable terminal can display an image of the material using display data rendered at another computer.

As described above, according to the present invention, an image processing device, method, and program capable of displaying the texture of a material in accordance with a change in the observation environment or a change in the orientation of the material can be provided.

Regardless of whether it was a paper medium or an electronic medium, there was a problem that a change in the appearance (texture) of the material in accordance with a change in the observation environment or a change in the orientation of the material cannot be expressed.

The present invention has an aspect to provide an image processing device, method, and program capable of displaying the texture of a material in accordance with a change in the observation environment or a change in the orientation of the material.

A first aspect of the present invention is an image processing device that displays an image of the texture of a material. The image processing device includes a rendering means. The rendering means is configured to render the display data of the material based on illumination information, material information on the texture of the material, and the relative positional relationship of a light source, the display surface on which an image of the material is displayed, and a viewer.

In one embodiment, a part or all of the illumination information, the material information on the texture of the material, and the relative positional relationship of a light source, the display surface on which an image of the material is displayed, and a viewer may be acquired from outside, or stored in the image processing device in advance, or acquired and detected by various acquisition means and detection means of the image processing device.

In one embodiment, the image processing device further includes a display means and an inclination detection means. The display means is configured to display an image of the material using the display data. The inclination detection means is configured to detect the orientation of the display surface of the display means. The rendering means is configured to render the display data of the material based on the orientation of the display surface of the display means detected by the inclination detection means, the illumination information, and the material information on the texture of the material. In one embodiment, the orientation of the display surface on which an image of the material is displayed is acquired from outside via a communication means.

In one embodiment, the image processing device further includes an ambient illumination information acquisition means configured to acquire ambient illumination information, and the rendering means renders display data based on ambient illumination information, material information, and the orientation of the display surface on which an image of the material is displayed. The image processing device further includes a communication means, and external illumination information obtained from outside via the communication means may replace the ambient illumination information. In one embodiment, the image processing device acquires ambient illumination information or external illumination information from outside via a communication means, and the rendering means renders display data based on the ambient illumination information or external illumination information acquired from outside, material information, and the orientation of the display surface on which an image of the material is displayed.

In one embodiment, the image processing device includes a viewer detection means configured to detect a direction of a viewer of an image of the material, and the rendering means is configured to render the display data based on the illumination information (ambient illumination information, external illumination information), the material information, the orientation of the display surface, and the direction of the viewer. In one embodiment, the image processing device acquires the direction of the viewer of an image of the material from outside via a communication means.

In one embodiment, the illumination information includes the direction, color components, and intensity of light. Further, the material information includes color characteristics, shape characteristics, and reflection characteristics for each pixel of an image of the material.

A second aspect of the present invention is an image processing method for displaying an image of the texture of a material executed by the above-described image processing device.

A third aspect of the present invention is a program that causes a computer to carry out the image processing method.

As described above, according to the present invention, an image processing device, method, and program capable of displaying the texture of a material in accordance with a change in the observation environment or a change in the orientation of the material can be provided.

REFERENCE SIGNS LIST

100 Portable terminal
102 Display unit (pressure-sensitive display)
104 Rendering unit (display data generation unit)
106 Ambient illumination information storage unit
108 Ambient illumination information acquisition unit (photometric device, illuminance sensor, camera)
110 Inclination detection unit (gyro sensor, acceleration sensor, magnetic sensor)
112 Input unit (keyboard, keypad, mouse, pointing device, microphone)
114 Communication unit (network IF card (NFC), wireless device)
116 Material information storage unit
118 Viewer detection unit (infrared sensor, camera)
202, 204 Electric lamp
206 Sun
208 Eye Obviously, numerous modifications and variations of the present invention are possible in light of the above teachings. It is therefore to be understood that within the scope of the appended claims, the invention may be practiced otherwise than as specifically described herein.

What is claimed is:

1. An image processing device, comprising:
   circuitry configured to
   render display data of a planar material, as if the surface of the planar material is overlaid on a display surface, based on illumination information corresponding to at least one light source, material information including texture information of the planar material, and a relative positional relationship, determined from position information obtained by a sensor from within a physical space, between the at least one light source, the display surface of a display of a handheld computing device on which an image of the planar material is displayed, and a viewer who is a user of the display of the handheld computing device,
   wherein the circuitry is configured to control detection of an orientation of the display surface of the display of the handheld computing device and to display an image of the planar material on the display of the handheld computing device using the display data, and the circuitry is configured to render the display data of the planar material based on the illumination information, the material information, and the detected orientation of the display surface of the display of the handheld computing device.

2. The image processing device of claim 1, wherein the circuitry is configured to control acquisition of ambient illumination information of the image processing device, and the illumination information used in rendering the display data comprises the ambient illumination information acquired.

3. The image processing device of claim 1, wherein the circuitry is configured to control detection of a direction of a viewer of an image of the planar material, and the circuitry is configured to render the display data based on the illumination information, the material information, an orientation of the display surface, and a direction of the viewer.

4. The image processing device of claim 1, wherein the circuitry is configured to communicate with an external device, and the illumination information used in rendering the display data comprises external illumination information acquired from the external device.

5. The image processing device of claim 1, wherein the illumination information includes a direction, a color component, and an intensity of light, and the material information includes shape characteristics and reflection characteristics for each pixel of an image of the planar material.

6. The image processing device of claim 1, wherein the circuitry is configured to render the display data of the planar material based on the relative positional relationship determined from position information between a light source, a display surface and a viewer calculated using a direction of light and at least one of the orientation of the display surface and a direction of a viewer's eye.

7. The image processing device of claim 1, wherein the illumination information is detected by a sensor from within the physical space.

8. A method of processing an image, comprising:
   rendering display data of a planar material, as if the surface of the planar material is overlaid on a display surface, based on illumination information corresponding to at least one light source, material information including texture information of the planar material, and a relative positional relationship determined from position information obtained by a sensor from within a physical space, between the at least one light source, the display surface of a display of a handheld computing device on which an image of the planar material is displayed, and a viewer who is a user of the display of the handheld computing device;

detecting an orientation of the display surface of the display of the handheld computing device;

rendering the display data of the planar material based on the illumination information, the material information, and the detected orientation of the display surface of the display of the handheld computing device; and displaying on the display of the handheld computing device an image of the planar material using the display data.

9. The method of claim 8, further comprising:
acquiring ambient illumination information,
wherein the rendering of the display data of the planar material comprises rendering the display data of the planar material based on the ambient illumination information, the material information, and the orientation of the display surface on which an image of the planar material is displayed.

10. The method of claim 8, further comprising:
detecting a direction of the viewer of an image of the planar material,
wherein the rendering of the display data of the planar material comprises rendering the display data based on the illumination information, the material information, the orientation of the display surface on which an image of the planar material is displayed, and the direction of the viewer.

11. The method of claim 8, further comprising:
acquiring external illumination information from an external device,
wherein the illumination information comprises the external illumination information.

12. The method of claim 8, wherein the illumination information includes a direction, a color component and an intensity of light, and the material information includes shape characteristics and reflection characteristics for each pixel of an image of the planar material.

13. A non-transitory computer-readable medium including computer executable instructions, wherein the instructions, when executed by a computer, cause the computer to perform a method of processing an image, comprising:
rendering, using circuitry, a planar display data of planar material, as if the surface of the planar material is overlaid on a display surface, based on illumination information corresponding to at least one light source, material information including texture information of the planar material, and a relative positional relationship determined from position information obtained by a sensor from within a physical space, between the at least one light source, the display surface of a display of a handheld computing device on which an image of the planar material is displayed and a viewer who is a user of the display of the handheld computing device;

detecting an orientation of the display surface of the display of the handheld computing device;

rendering the display data of the planar material based on the illumination information, the material information, and the detected orientation of the display surface of the display of the handheld computing device; and displaying on the display of the handheld computing device an image of the planar material using the display data.

14. The non-transitory computer-readable medium of claim 13, wherein the method further comprises:
acquiring ambient illumination information,
wherein the circuitry is configured to render the display data of the planar material based on the ambient illumination information acquired, the material information, and the orientation of the display surface of the display of the handheld computing device.

15. The non-transitory computer-readable medium of claim 13, wherein the method further comprises:
detecting a direction of the viewer of an image of the planar material, and
wherein the display data is rendered based on the illumination information, the material information, the orientation of the display surface of the display of the handheld computing device, and the direction of the viewer.

16. The non-transitory computer-readable medium of claim 13, wherein the method further comprises:
acquiring external illumination information from an external device,
wherein the display data of the planar material is rendered based on the external illumination information, the material information, and the orientation of the display surface of the display of the handheld computing device.

17. The non-transitory computer-readable medium of claim 13, wherein the illumination information includes a direction, a color component and an intensity of light, and the material information includes shape characteristics and reflection characteristics for each pixel of an image of the planar material.

* * * * *